(12) United States Patent
Wilhelm et al.

(10) Patent No.: US 8,074,954 B2
(45) Date of Patent: Dec. 13, 2011

(54) RAIL FOR POSITIONING AND LOCKING OF ELEMENTS, AND A CORRESPONDING FITTING

(75) Inventors: Arne Wilhelm, Schwiederstorf (DE); Peter Popp, Krupunder (DE); Karel Smetana, Hamburg (DE)

(73) Assignee: Airbus Deutschland GmbH (DE)

( * ) Notice: Subject to any disclaimer, the term of this patent is extended or adjusted under 35 U.S.C. 154(b) by 519 days.

(21) Appl. No.: 12/011,949

(22) Filed: Jan. 30, 2008

(65) Prior Publication Data

US 2008/0197234 A1    Aug. 21, 2008

Related U.S. Application Data

(60) Provisional application No. 60/898,279, filed on Jan. 30, 2007.

(30) Foreign Application Priority Data

Jan. 30, 2007    (DE) .......................... 10 2007 004 554

(51) Int. Cl.
*A47B 97/00* (2006.01)
(52) U.S. Cl. .................. 248/503.1; 244/118.6
(58) Field of Classification Search ............. 244/118.5, 244/118.6, 122 R; 248/424, 429, 503.1; 296/65.13, 65.14
See application file for complete search history.

(56) References Cited

U.S. PATENT DOCUMENTS

| | | | | | |
|---|---|---|---|---|---|
| 4,213,593 | A | * | 7/1980 | Weik | 248/501 |
| 4,230,432 | A | * | 10/1980 | Howell | 410/102 |
| 4,396,175 | A | * | 8/1983 | Long et al. | 248/503.1 |
| 4,449,875 | A | * | 5/1984 | Brunelle | 410/80 |
| 5,083,726 | A | * | 1/1992 | Schurr | 244/118.6 |
| 5,236,153 | A | * | 8/1993 | LaConte | 244/118.6 |
| 6,053,529 | A | * | 4/2000 | Frusti et al. | 280/735 |
| 7,455,276 | B2 | * | 11/2008 | Frey | 248/500 |

FOREIGN PATENT DOCUMENTS

| | | |
|---|---|---|
| DE | 10337746 | 3/2005 |
| FR | 1326559 | 5/1963 |
| JP | 58126227 A * | 7/1983 |

* cited by examiner

*Primary Examiner* — Tien Dinh
*Assistant Examiner* — Joseph W Sanderson
(74) *Attorney, Agent, or Firm* — Lerner, David, Littenberg, Krumholz & Mentlik, LLP

(57) ABSTRACT

A rail for fastening installations in an aircraft, the rail including a rail base section, a running-surface section that extends in a longitudinal direction with a running surface, and a connection section that connects the running-surface section to the rail base section at the face pointing away from the running surface. The running-surface section laterally on both sides, in each case spaced apart at a predetermined pitch, includes a multitude of projections projecting away from the connection section, each with a top that has substantially the same alignment as the running surface and a bottom that has an alignment that substantially is opposed to the alignment of the running surface. The bottom of the projections forms holding surfaces for holding a fitting. The rail is attached to a floor of the aircraft.

7 Claims, 5 Drawing Sheets

Fig. 5

RAIL FOR POSITIONING AND LOCKING OF ELEMENTS, AND A CORRESPONDING FITTING

CROSS-REFERENCE TO RELATED APPLICATIONS

This application claims the benefit of the filing date of U.S. Provisional Patent Application No. 60/898,279 filed Jan. 30, 2007, the disclosure of which is hereby incorporated herein by reference.

BACKGROUND OF THE INVENTION

The present invention relates to a device, and in particular to a rail, for the positioning and locking of elements and a corresponding fitting, and in particular to a rail and an associated fitting, which make possible improved positioning of elements in, for example, an aircraft.

For fastening installations or elements in an aircraft, in aircraft, and in particular in aeroplanes, rail systems are used that make it possible to fasten, for example, seats to the floor of a passenger cabin and at the same time make it possible to vary the cabin configuration.

Rail configurations are known for the cabin region, in which rail configurations a rail with an elongated groove is provided, which at regular spacing comprises projections so that counterparts of fittings or of fastening elements can be inserted in the spaces of the projections. By being slid under the projections with subsequent locking, the fittings can be securely fastened. In the fastening elements or fittings, running surfaces or sliding surfaces are provided, on which the fastening element can slide in or on the rail in order to position the element to be installed before it is subsequently locked. Due to the small size of the sliding surfaces on the fittings, the reconfiguration characteristics of an installed seat in today's seat rail constructions are insufficient in that as a result of high point loads it is easily possible for damage to the rail surface to occur. Furthermore, locking in the direction of the longitudinal axis of the aircraft has hitherto been comparatively involved. Moreover, the use of lighter but also more brittle rail materials, for example for seat rails, in today's shape of the rails has a negative effect on the results of the dynamic seat tests.

Furthermore, rail arrangements from the region of the pilot seat configuration are known, in which the rail is essentially designed like a railway line with an enlarged head, wherein in a special region of the rail corresponding openings are provided so that precisely in this region fittings can be placed on the rail, by means of which fittings the pilot seat is then attached. In this arrangement the pilot seats, in contrast to cabin seats, are very often slid along the longitudinal axis of the aircraft, but without there being a possibility or requirement to be able to install or deinstall the seat at different positions of the rail. In other words, on a fastening rail for pilot seats there is only a single seat that can be placed in a fixed position on the seat rail and that can then be positioned on this seat rail in accordance with requirements. However, in a pilot seat rail the installation position of the seat is only in a single position on the entire rail so that the seat has to be brought precisely to this position in order to be able to be installed or deinstalled. This also takes place for reasons of safety so that while in the case of negligent locking the pilot seat can unintendedly slide, it cannot however become detached from the rail.

SUMMARY OF THE INVENTION

Against the background of the state of the art as described, there may be a need to provide a rail and an associated fitting, that allows improved positionability and lockability of cabin installations, in particular of seat elements.

According to an exemplary embodiment of the invention, a rail for fastening installations in an aircraft is provided, comprising a rail base section, a running-surface section that extends in a longitudinal direction and comprises a running surface, and a connection section that connects the running-surface section to the rail base section at the face pointing away from the running surface, wherein the running-surface section laterally on both sides, in each case spaced apart by a predetermined pitch dimension, comprises a multitude of projections, each with a top that has essentially the same alignment as the running surface, and a bottom that has an alignment that essentially is opposed to the alignment of the running surface, wherein the bottom of the projections forms holding surfaces for holding a fitting.

In other words, the invention is based on the principle of a railway track, wherein the rail of the present invention can, for example, be produced as an extruded profile that is reworked by means of metal cutting. In this way it is possible to incorporate throats or bulges 128, lips or projections 121, and holes or recesses 126 that, in accordance with the length of the rail can be repeated as often as required. By means of the arrangements of recesses and projections repeated at the pitch dimension, the element to be fastened can be deinstalled from the rail or installed on the rail at defined stages. This makes it possible for elements or seats to be able to be installed in and deinstalled from a multitude of positions, while at the same time the bearing surfaces on the running surfaces are enlarged. The installation positions can be arranged at a comparatively small pitch so that great flexibility in the seat arrangement is made possible. The large bearing surface of the fitting on the rail, which large bearing surface is achieved at the same time, prevents damage to the rail and to the fitting from occurring.

According to an exemplary embodiment of the invention, the rail is designed such that the tops of the projections form part of the running surface.

In this way the bearing surfaces can be enlarged, which not only reduces the surface load but consequently also results in less damage to the surfaces.

According to an exemplary embodiment of the invention, the rail is designed such that the projections on both sides are essentially symmetrical to each other in relation to an axis in longitudinal direction of the straight-line running-surface section.

In this way the fittings can be designed so as to be symmetrical, which in relation to material distribution and thus stability results in increased strength.

According to an exemplary embodiment of the invention, the projections on each side can also be provided at an offset of half a pitch dimension, as a result of which the running surface assumes a serpentine shape but nevertheless has an essentially constant width so that the running surface and bearing surface is essentially constant along the axis of longitudinal extension, irrespective of the position within a pitch of the pitch dimension.

According to an exemplary embodiment of the invention, the rail is designed such that the running-surface section in the running surface along an axis in longitudinal direction of the straight-line running-surface section comprises a multitude of recesses that are spaced apart from each other by one pitch dimension, which recesses can be made to engage a notch projection of a fitting, wherein this pitch dimension corresponds to the pitch dimension of the projections.

In this way locking of the fastening elements or fittings can take place, in particular because as a result of engaging a notch projection with a corresponding recess in the running surface, secure positioning and locking of the element or seat can be achieved. It should be noted that the recesses in the running surface can be completely surrounded by the running surface. In this way a situation can be prevented where, in contrast to recesses in the form of bays, increased stability can be achieved because the force can be taken up by a closed material ring, and there is thus no collar load on the recesses in the running surface.

According to an exemplary embodiment, the rail is designed such that the recesses in the running surface are not offset in relation to the projections of at least one side. This means that in an embodiment in which the projections on both sides are arranged so as to be essentially symmetrical in relation to each other, the recesses are not offset in relation to the projections and thus the recesses are provided at the widest positions of the running surface, as a result of which the bearing width on the running surface along the axis of longitudinal extension does not comprise any great changes. In other words, the recesses are provided at those positions at which the running surface is wider, so that better running characteristics during sliding of an element on the rail can be achieved.

According to an exemplary embodiment, the rail is designed such that the running surface comprises a coating that reduces the coefficient of friction. Such a coating can, for example, comprise a plastic or the like, so that sliding of the components or elements on the rail is facilitated. This is, in particular, sensible because the use of lubricants and sliding agents in the field of aviation is subject to strict conditions so that avoiding the use of a lubricant and sliding agent by providing a corresponding coating is also associated with fewer problems in relation to these conditions. Furthermore, the use of lubricants and sliding agents in the cabin region of a passenger aircraft is not acceptable, if nothing else due to the danger of passengers soiling their garments.

According to an exemplary embodiment of the invention, a fitting is provided for fastening installations in an aircraft, wherein the fitting is adapted to be fastened to a rail according to the invention, wherein the fitting comprises a running-surface element with a running surface provided thereon, which running surface is adapted such that it is slidable, resting against a running surface of the rail, wherein the running-surface element in each case comprises a multitude of holding collar elements laterally projecting towards each other, each comprising a bottom that is essentially situated opposite the running surface, wherein the bottom of the holding collar elements forms holding surfaces for holding the fitting to the rail, such that the holding collar elements of the fitting in a plurality of first positions spaced apart from each other by one pitch dimension can be made to engage spaces, spaced apart from each other by one pitch dimension, of projections of the rail, and the fitting can be placed in a multitude of second positions that are located between the first positions, in which second positions at least some of the holding surfaces of the holding collar elements engage in a non-positive manner some of the holding surfaces of the rail.

In this way a fitting can be provided which comprises a large bearing surface on the rail, when compared to the state of the art, and which at the same time allows installability and de-installability on a multitude of positions on the rail. In this arrangement the holding surfaces on the bottom of the holding collar elements engage the holding surfaces of the bottom of the projections of the rail so that a secure connection between the holding elements or fittings and the rail can be ensured in order to fasten components or seats safely and securely in a cabin space of an aircraft.

According to an exemplary embodiment, the fitting is designed such that the multitude of holding collar elements provided on both sides are spaced apart from each other by a pitch dimension that corresponds to the pitch dimension of the projections of the rail.

In this manner the fitting can be placed onto the rail, namely at various positions that are spaced apart from each other by only a short space, so that great flexibility is achieved. Due to the matching pitch dimensions of its holding collar elements and the projections of the rail, the fitting can be placed perpendicularly onto the rail without any threading having to take place. This is of importance in particular in those cases when only little space for installation is available.

According to an exemplary embodiment of the invention, the fitting is designed such that a holding collar element arrangement on both sides is essentially symmetrical in relation to each other relative to an axis in the direction of movement of the fitting on the rail.

By means of the symmetrical design an advantageous force distribution can be achieved, in particular because as a rule the front and rear holding collar elements are subjected to the greatest load during a tilt movement, so that during such exposure to load the load can, for example, be distributed to two elements. However, the lateral holding collar elements can also be displaced laterally in relation to each other if a corresponding rail configuration requires this.

According to an exemplary embodiment of the invention, the fitting comprises a notch projection that is movable between a first position and a second position, which notch projection in the first position projects into a plane in which the running surface of the fitting is situated, wherein the notch projection is designed such that it can be made to engage at least one recess in the running surface of the rail. In this way the fitting can be connected so as to be locked to the rail, namely in a position in which the holding surfaces of the fitting are connected in a non-positive manner with the holding surfaces of the rail, so that secure fastening of the elements or seats on the rail can be achieved. In this arrangement the notch projection can furthermore comprise a spring or a straining screw in order to prevent unintended undoing of the notch projection. Furthermore, by means of a straining screw a situation can be achieved wherein the holding surfaces of the fitting and the holding surfaces of the rail are pressed together at greater force so that the friction between the adhesive surfaces increases and a more secure connection is made possible.

According to an exemplary embodiment, the fitting is designed such that the notch projection does not have any offset in relation to the projections of at least one side of the rail.

In this way a situation can be achieved in which the holding surfaces of the fitting and the holding surfaces of the rail are aligned optimally in relation to each other so as to obtain the largest possible overlap between the holding surfaces of the fitting and the holding surfaces of the rail so as to provide the greatest possible bearing surface.

According to an exemplary embodiment, the fitting is designed such that the running surface comprises a coating that reduces the coefficient of friction.

In this way a situation can be achieved in which the elements or seats to be installed, which are fastened to the rail by means of the fitting, in the non-locked state can be displaced more easily on the rail, in particular when the holding surfaces of the fitting and the holding surfaces of the rail are not connected to each other in a non-positive manner and the notch is in a second position, in which it does not engage a recess.

According to an exemplary embodiment of the invention, a rail-fitting connection is provided that comprises a rail according to the invention and a fitting according to the invention.

The resulting advantages are based on the corresponding advantages of the fitting according to the invention and of the rail according to the invention.

According to an exemplary embodiment of the invention, an aircraft with a rail according to the invention is provided.

According to an advantageous embodiment of the invention, an aircraft comprising a rail-fitting connection according to the invention is provided.

It should be mentioned that the individual features of the fitting can also be combined, just as the individual features of the rail can be combined.

These and other aspects of the invention become clear with reference to the embodiments that are described below.

DETAILED DESCRIPTION

Figure 1A:
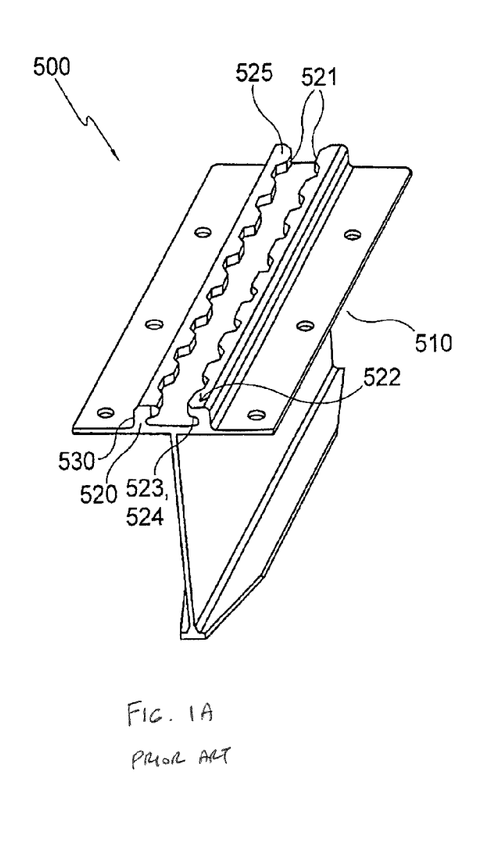
FIGS. 1A-1C show a conventional rail and fittings for a seat attachment in a passenger cabin.
Figures 1B, 1C:
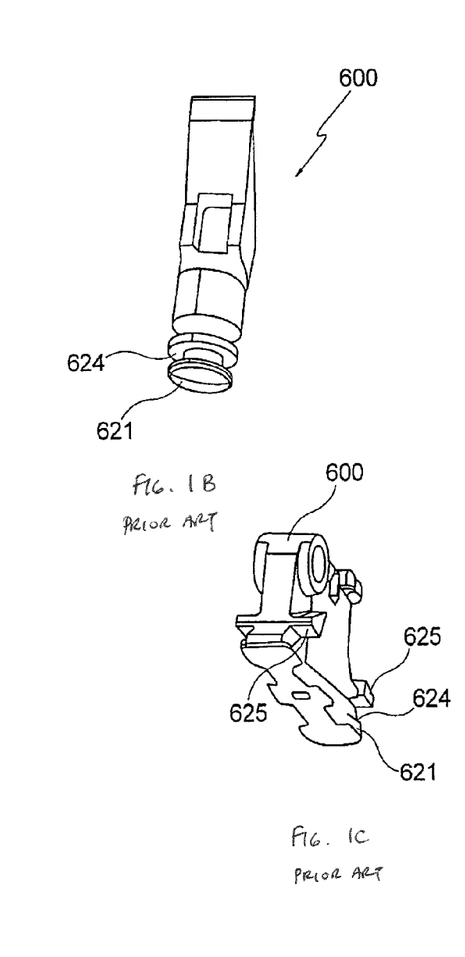

FIGS. 1A-1C show a seat rail 500 with a rail base section 510, a running-surface section 520 and a connection section 530. In this arrangement the running-surface section is the elongated arrangement that comprises projections 521, which arrangement comprises a running surface 525 on its top. The projections 521 comprise a top 522 and a bottom 523, wherein the bottom 523 forms a holding surface 524.

On such a rail, in the passenger cabin region, elements or seat elements are fastened to the floor of the passenger cabin. In this arrangement the seat elements are, for example, attached by way of two different fittings, wherein, for example, one fitting can merely serve as a support, wherein another fitting can serve not only as a support but also as a locking device. These fittings 600 are designed such that they comprise holding collar elements 621 that are attached to a body such that they can be inserted into the spaces formed by the projections 521 of the rail. In this arrangement the fitting 600 comprises running surfaces 625 that rest against the running surface 525 of the rail. In this arrangement the projections 621 can be inserted into the spaces between the projections 521 and can be displaced by half a pitch dimension so that the holding surfaces 624 are opposite the holding surfaces 524 of the rail 500. When the fittings are braced in the rail, the holding surfaces 524 and 624 can be connected to each other in a non-positive manner.

However, this arrangement has a serious disadvantage in that the bearing surfaces of the running surfaces 625 of the fitting 600 are relatively small because otherwise it is no longer possible to affix a locking device for locking the rail to the fitting 600 in longitudinal direction. It should be noted that the fitting 600 rests against the top edge of the rail 500, i.e. the running surfaces 625 of the fitting 600 rest against the running surface 525 of the rail, but not against the bottom of the groove of the rail, because in that location there are frequently dirt deposits which when subjected to pressure-sliding forces can result in the rail surface becoming damaged.

Figure 2A:
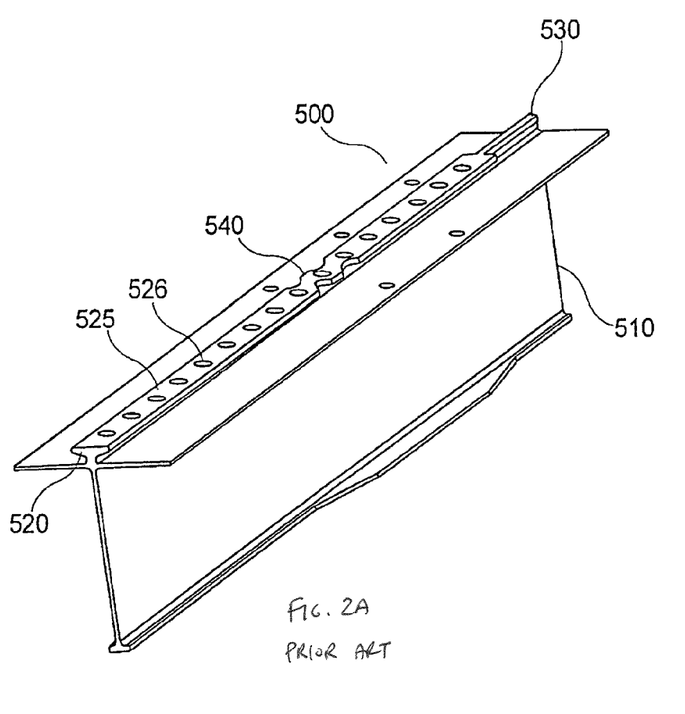
FIGS. 2A-2C show a conventional fitting and a rail for a seat attachment of a pilot seat.
Figure 2B:
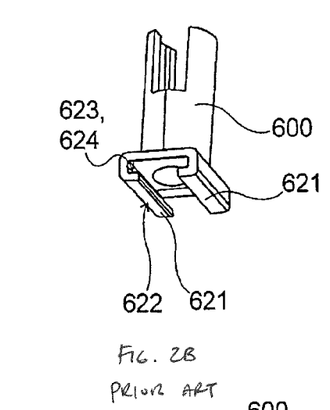
Figure 2C:
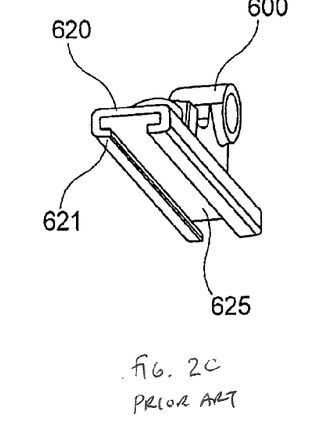

FIGS. 2A-2C show an embodiment of a fastening rail for a pilot seat, wherein the rail comprises a rail base 510, a running-surface section 520 and a connection element 530. The connection element 530 connects the running-surface section 520 with the rail base section. The running-surface section 520 comprises a running surface 525 on which the fittings rest. Fastening of the seats on the rail 500 is by way of the fittings 600 shown, wherein on the fittings a running-surface section 620 is also provided which comprises a running surface 625 that rests on the running surface 525 of the rail 500. Furthermore, a projection 621 of the running surface 525 is provided, with which the fitting runs on the rail 500 such that it is not unintendedly removed from the rail. The projection 621 comprises a top 622 and a bottom 623, wherein the bottom 623 faces the running surface 625. In this arrangement, holding surfaces 624 are formed on the bottom 623, which holding surfaces 624 reach below the running-surface section 520 of the rail 500, in this way preventing unintended removal of the fitting from the rail.

In order to remove a seat affixed with the fittings 600 shown, from the rail 500 in FIG. 2A, in the present case a pilot seat, the seat has to be brought into a position that is offset to the rear from the viewer's perspective, so that the elongated fitting 600 comes to rest on a rear region of the rail, in which a connection section to the guide 530 is provided but no running-surface section 520 is provided any more. The shorter fitting 600 is then at a determined position of the rail 540 that comprises recesses 526 such that the projections 621 of the short fitting can reach through these recesses so that the pilot seat in its fully pushed-back state can be removed from the rail. This is so for reasons of safety alone, so that if the pilot seat is not properly installed and is negligently locked it can slide in an unintended manner but it cannot become detached from the rail itself. However, as a rule, on a rail for a pilot seat only a single seat is installed so that for a pilot seat rail it is not disadvantageous if the pilot seat can be removed from the seat rail only in one position, as a result of which a relatively large space is required in order to be able to carry out installation or deinstallation.

Figure 3A:
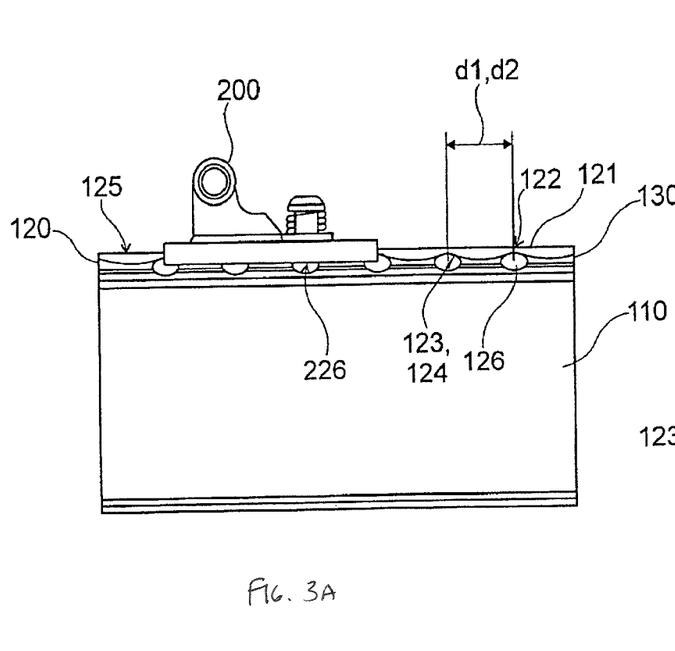
FIGS. 3A-3B show a rail according to an exemplary embodiment of the invention.
Figure 3B:
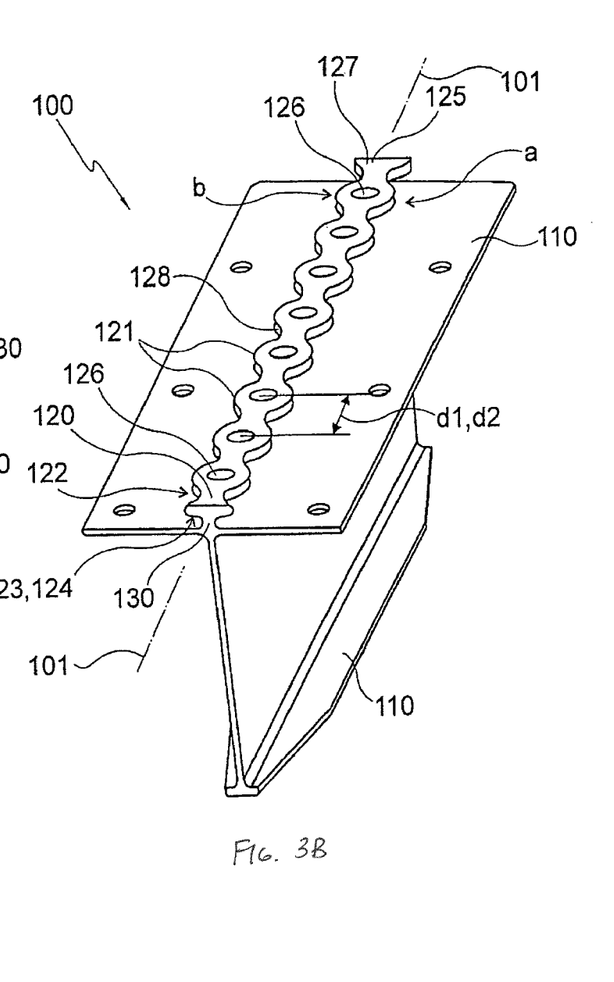

FIGS. 3A-3B show an exemplary embodiment of a rail according to the invention, wherein the rail according to the invention comprises a rail base section 110 as well as a running-surface section 125, which on the side pointing away from the running surface 125 is connected to the rail base section 110 by means of a connection section 130. In this arrangement the running surface section 120 comprises projections 121, regularly spaced apart at a pitch dimension d1, d2, with each projection 121 comprising a top 122 and a bottom 123. In this arrangement the top 122 is essentially aligned in the same way as the running surface 125, wherein the alignment of the bottom 123 is essentially opposite to that of the running surface 125. In this arrangement the bottom forms holding surfaces 124 which can be engaged by holding surfaces of a fitting so as to stop movement in vertical direction, i.e. along the axis of longitudinal extension. In the embodiment shown, the tops 122 of the projections 125 are arranged such that they form part of the running surface 125. However, this is not mandatory. Instead, the projection 121 can also be designed such that the top 122 of the projection 121 is, for example, inclined in relation to the running surface 125 or is, for example, set back. In the embodiment shown in FIGS. 3A-3B the projections 121 are provided on both sides a, b, wherein it should be mentioned that it is also possible to provide a rail that comprises such projections only on one side; in other words, a rail which essentially comprises a geometric shape that corresponds to a rail as described above that along a symmetry axis is divided in cross section. Recesses 126 are provided in the running surface 125, which can, for example, be in the form of blind holes, but which can also be designed such that they reach through the running surface 125 but comprise a diameter that is larger than the width of the connection section 130 so that the connection section is interrupted at this point. This provides an advantage in that any dirt deposits in the recesses 126 can fall out laterally at the height of the connection section 130 so that no dirt builds up in the recesses 126.

In each case indentations 128 form between the projections, with a fitting being able to engage said indentations 128.

The recesses 126 are arranged along an axis 101 that corresponds to the axis of longitudinal extension of the rail arrangement. In this arrangement the recesses 126 do not have an offset in relation to the projections 121, so that in each case at the positions at which the running surface section 120 is wider due to the projections 121 these recesses 126 are provided so that the effective bearing width of the bearing surface 125 is fairly even along the axis 101.

A fitting 200 can be placed on the rail 100, wherein the fitting 200 comprises a notch 226 that can be moved to and from between two positions III and IV. In position III of these positions the notch 226 projects into the plane in which the running surface 125 is also situated so that the notch 226 in this position III can, for example, engage one of the recesses 126. While the slide-shaped design of the fitting results in the fitting being unable to be moved away from the rail in vertical direction, for example in that the holding surfaces 124 of the rail and the holding surfaces 224 of the fitting engage each other in a non-positive manner, the notch 226 prevents the fitting from being able to be moved in the horizontal direction when it has locked into one of the recesses 126. In order to undo the locking action, the notch 226 can be moved to the withdrawn position IV, in which the notch no longer projects into the plane in which the running surface 225 is also situated.

Figures 4A, 4B, 4C:
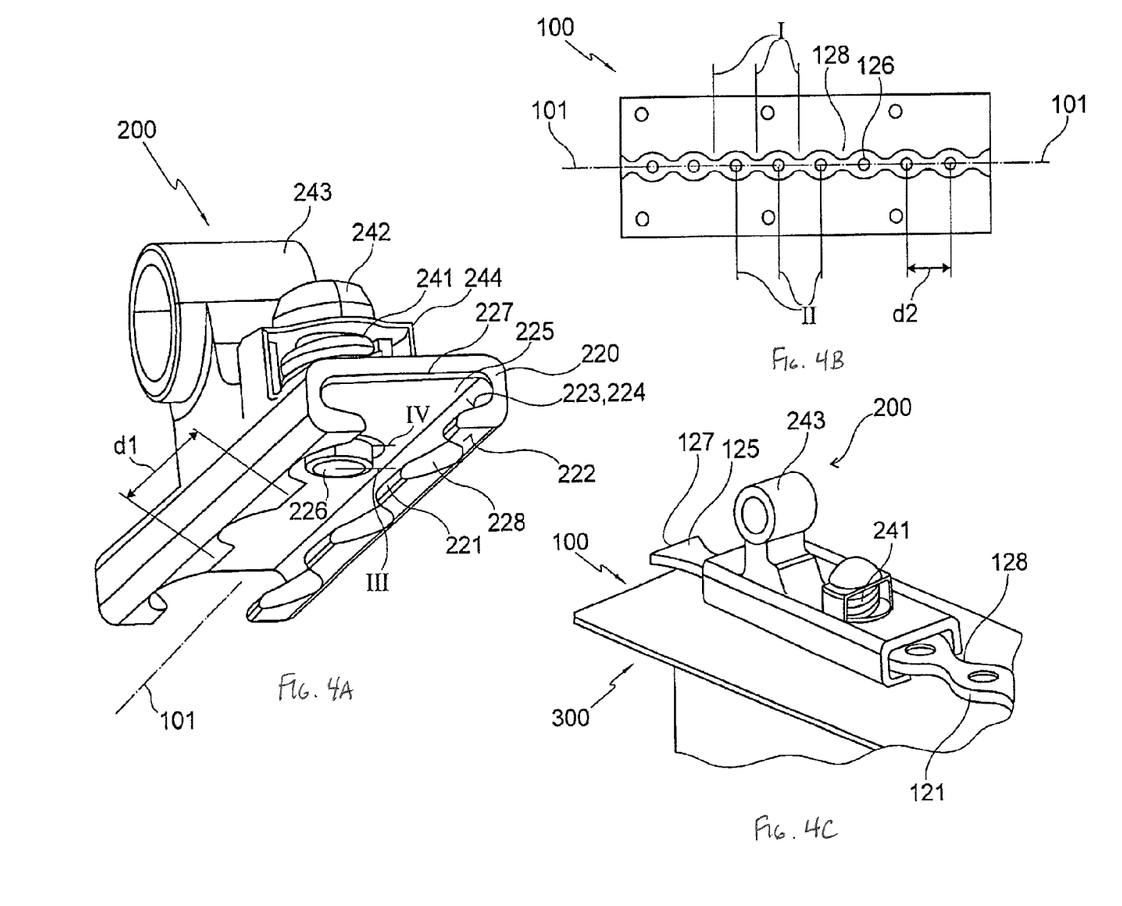
FIGS. 4A-4C shows a fitting according to an exemplary embodiment of the invention.

FIGS. 4A-4C show an exemplary embodiment of a fitting 200. In this arrangement the fitting comprises a running-surface section 220 with a running surface 225. Furthermore, laterally on both sides of the running-surface section 220, holding collar elements 221 are provided which project over the running surface 225 such that the projections of both sides project towards each other and according to the embodiment shown are arranged so as to be symmetrical along an axis 101. In this arrangement the projections 221 comprise a distance d1 at a pitch dimension which corresponds to the pitch dimension of the projections 121 of the rail 100. In this arrangement the holding collar elements 221 are designed such that they can engage the spaces 128 of the rail 100, which spaces are formed by two adjacent projections 121. Likewise, the fitting 200 comprises bulges 228 that are designed such that the projections 121 of the rail 100 can reach through said fitting 200. In this arrangement in a first position I the fitting can be placed onto the rail 100 such that the holding collar elements 221 can reach through the bulges 128 of the rail 100. If the fitting is then, for example, displaced by half a pitch in the pitch dimension so that position II is assumed, which position is situated between two adjacent positions I, then the holding surfaces 224 on the bottom 223 of the holding collar elements 221 can engage the holding surface 124 of the bottom 123 of the projections 121 of the rail 100 in a non-positive manner. In this position the notch 226 of the fitting 200 is situated opposite one of the recesses 126 such that when the notch 226 is moved from a second position IV to a first position III the notch reaches through the plane in which the running surfaces 125, 225 are also situated, so that the notch 226 engages one of the recesses 126, for example in a positive-locking manner. In this way a situation is prevented in which the fitting 200 can move along the axis 101 on the rail 100.

In this arrangement the pitch dimension d2 of the recesses 126 corresponds to the pitch dimension d1 of the holding collar elements 221 or of the projections 121.

In this arrangement the fitting can comprise a coating 227 that reduces the coefficient of friction that exists between the running surface 225 of the fitting 200 and the running surface 125 of the rail 100. Such a coating can, for example, be a special plastic material. As an alternative or in addition, the rail 100 can also comprise a coating 127 that reduces the coefficient of friction. The coating is equivalent to surface treatment which while resulting in a changed surface is not, however, an explicit layer.

The notch can furthermore comprise a spring 241 that locks the notch 226 against unintended movement from position III to position IV. Furthermore, a straining screw 242 can be provided which not only can be used to actuate the notch 226 but can also actuate a locking mechanism that locks the notch 226 in position III. Furthermore, a fastening device 243 can be provided on the fitting 200, to which fastening device 243 the actual element or seat element can be fastened. Furthermore, FIG. 4C shows a rail-fitting connection 300 that comprises a rail 100 according to the invention and a fitting 200 according to the invention.

Figure 5:
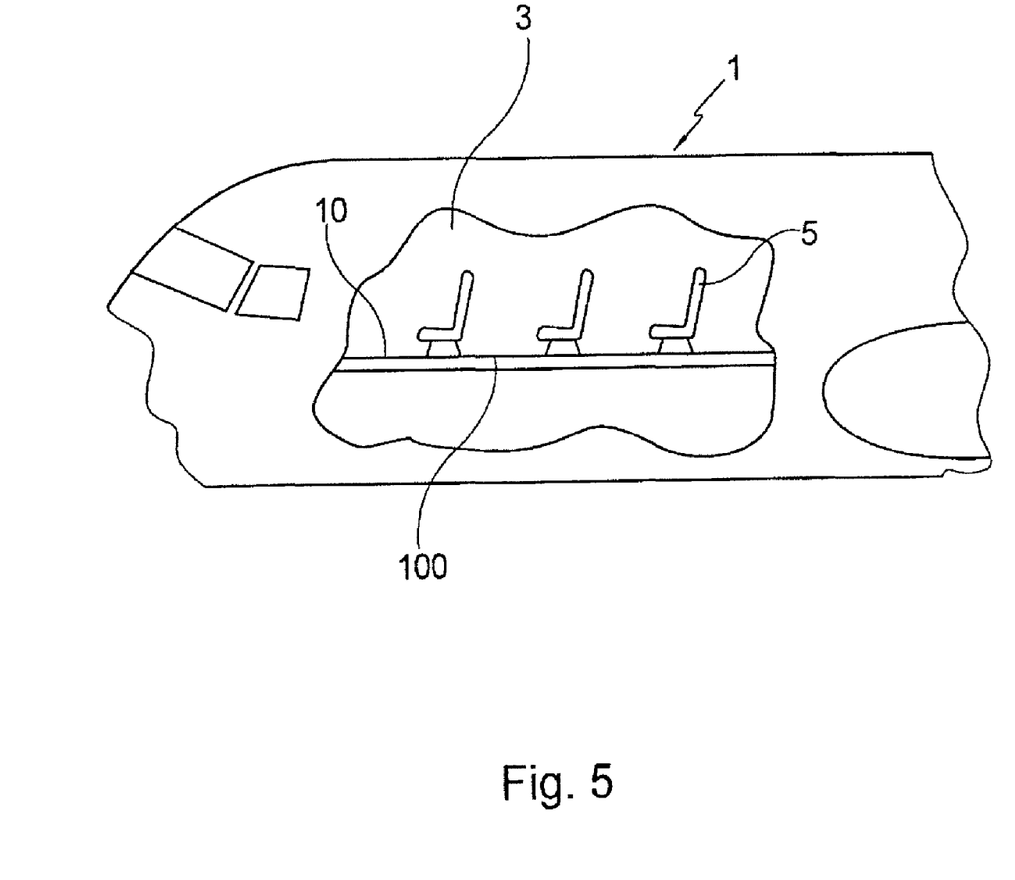
FIG. 5 shows a diagrammatic view of a cabin configuration according to an embodiment of the invention.

FIG. 5 shows a cabin configuration of an aircraft 1, in which a multitude of seats 5 are arranged on the floor region 10 of a passenger cabin 3. In this arrangement the rail 100 is located in the floor region 10 of the aircraft, wherein the fittings are located at the lower ends of the seat legs or of the seat-leg supporting framework of the seat 5.

It should be noted that the present invention can not only be used for aircraft, in particular aeroplanes, but can also be applied in other means of transport, for example trains, ships or buses, and is not limited to aircraft. Likewise it should be understood that the rail according to the invention, the fitting arrangement according to the invention and the rail-fitting connection can not also be used as seat fastening devices but also as other fastening devices, for example in positions in which fast reconfiguration of installations of whatever type is necessary.

Furthermore, it should be pointed out that the term "comprising" does not exclude other elements, and "a" or "one" does not exclude a plural number. Various units and elements that have been described in the context of various embodiments can also be combined.

It should be noted that references in the claims should not be construed as being limiting in relation to the scope of protection, but instead that the scope of protection is defined by the claims.

The invention claimed is:

1. A system for fastening installations in an aircraft, comprising:
   a rail;
   wherein the rail is attached to a floor of the aircraft a fitting;
   wherein the fitting is adapted to be fastened to a rail for fastening installation in an aircraft;
   wherein the rail comprises:
   a rail base section;
   a running-surface section that extends in a longitudinal direction and comprises a running surface; and
   a connection section that connects the running-surface section to the rail base section at the face pointing away from the running surface, wherein the running-surface section laterally on both sides, in each case spaced apart at a predetermined pitch, comprises a multitude of projections projecting away from the connection section, each with a top that has substantially the same alignment as the running surface and a bottom that has an alignment that substantially is opposed to the alignment of the running surface, wherein the bottom of the projections forms holding surfaces for holding the fitting;

wherein the fitting comprises:
 a running-surface element with a running surface provided thereon, which running surface is adapted such that it is slidable, resting against a running surface of the rail,
 wherein the running-surface element in each case comprises a multitude of holding collar elements, on each side projecting towards each other, each comprising a bottom that is substantially situated opposite the running surface, wherein the bottom of the holding collar elements forms holding surfaces for holding the fitting to the rail, such that the holding collar elements of the fitting in a plurality of first positions spaced apart from each other by one pitch dimension can be made to engage spaces, spaced apart from each other by one pitch dimension, of projections of the rail, and the fitting can be placed in a multitude of second positions that are located between the first positions, in which second positions at least some of the holding surfaces of the holding collar elements engage in a non-positive manner some of the holding surfaces of the rail,
 wherein the fitting comprises a notch projection that is movable between a first position and a second position, which notch projection in the first position projects into a plane in which the running surface of the fitting is situated, wherein the notch projection is designed such that it can be made to engage at least one recess in the running surface of the rail.

2. The system of claim 1, wherein the multitude of holding collar elements provided on both sides are spaced apart from each other by one pitch dimension that corresponds to the pitch dimension of the projections of the rail.

3. The system of claim 1, wherein a holding collar element arrangement on both sides is substantially symmetrical in relation to each other relative to an axis in the direction of movement of the fitting on the rail.

4. The system of claim 1, wherein the notch projection does not have any offset in relation to the projections of at least one side of the rail.

5. The system of claim 1, wherein the running surface comprises a non-liquid coating that reduces the coefficient of friction.

6. A rail-fitting connection comprising:
 a rail for fastening installations in an aircraft, wherein the rail is attached to a floor of the aircraft, comprising:
 a rail base section; a running-surface section that extends in a longitudinal direction and comprises a running surface; and
 a connection section that connects the running-surface section to the rail base section at the face pointing away from the running surface, wherein the running-surface section laterally on both sides, in each case spaced apart at a predetermined pitch, comprises a multitude of projections projecting away from the connection section, each with a top that has substantially the same alignment as the running surface and a bottom that has an alignment that substantially is opposed to the alignment of the running surface, wherein the bottom of the projections forms holding surfaces for holding a fitting; and
 a fitting, adapted to be fastened to the rail, comprising:
 a running-surface element with a running surface provided thereon, which running surface is adapted such that it is slidable, resting against a running surface of the rail,
 wherein the running-surface element in each case comprises a multitude of holding collar elements, on each side projecting towards each other, each comprising a bottom that is substantially situated opposite the running surface, wherein the bottom of the holding collar elements forms holding surfaces for holding the fitting to the rail, such that the holding collar elements of the fitting in a plurality of first positions spaced apart from each other by one pitch dimension can be made to engage spaces, spaced apart from each other by one pitch dimension, of projections of the rail, and the fitting can be placed in a multitude of second positions that are located between the first positions, in which second positions at least some of the holding surfaces of the holding collar elements engage in a non-positive manner some of the holding surfaces of the rail,
 wherein the fitting comprises a notch projection that is movable between a first position and a second position, which notch projection in the first position projects into a plane in which the running surface of the fitting is situated, wherein the notch projection is designed such that it can be made to engage at least one recess in the running surface of the rail.

7. An aircraft comprising a rail-fitting connection, the rail fitting connection comprising:
 a rail, wherein the rail is attached to a floor of the aircraft, the rail comprising:
 a rail base section;
 a running-surface section that extends in a longitudinal direction and comprises a running surface; and
 a connection section that connects the running-surface section to the rail base section at the face pointing away from the running surface, wherein the running-surface section laterally on both sides, in each case spaced apart at a predetermined pitch, comprises a multitude of projections projecting away from the connection section, each with a top that has substantially the same alignment as the running surface and a bottom that has an alignment that substantially is opposed to the alignment of the running surface, wherein the bottom of the projections forms holding surfaces for holding a fitting; and
 a fitting, adapted to be fastened to the rail, comprising:
 a running-surface element with a running surface provided thereon, which running surface is adapted such that it is slidable, resting against a running surface of the rail,
 wherein the running-surface element in each case comprises a multitude of holding collar elements, on each side projecting towards each other, each comprising a bottom that is substantially situated opposite the running surface, wherein the bottom of the holding collar elements forms holding surfaces for holding the fitting to the rail, such that the holding collar elements of the fitting in a plurality of first positions spaced apart from each other by one pitch dimension can be made to engage spaces, spaced apart from each other by one pitch dimension, of projections of the rail, and the fitting can be placed in a multitude of second positions that are located between the first positions, in which second positions at least some of the holding surfaces of the holding collar elements engage in a non-positive manner some of the holding surfaces of the rail, wherein the fitting comprises a notch projection that is movable between a first position and a second position, which notch projection in the first position projects into a plane in which the running surface of the fitting is situated, wherein the notch projection is designed such that it can be made to engage at least one recess in the running surface of the rail.

* * * * *

UNITED STATES PATENT AND TRADEMARK OFFICE
CERTIFICATE OF CORRECTION

PATENT NO. : 8,074,954 B2
APPLICATION NO. : 12/011949
DATED : December 13, 2011
INVENTOR(S) : Arne Wilhelm It is certified that error appears in the above-identified patent and that said Letters Patent is hereby corrected as shown below:

On the Title page, Item (75) Inventors: "Peter Popp, Krupunder (DE); Karel Smetana, Hamburg (DE)" should read --Peter Popp, Brno, Czech Republic; Karel Smetana, Arbon, Switzerland--.

Signed and Sealed this
Ninth Day of July, 2013

Teresa Stanek Rea
*Acting Director of the United States Patent and Trademark Office*